Figure 1:
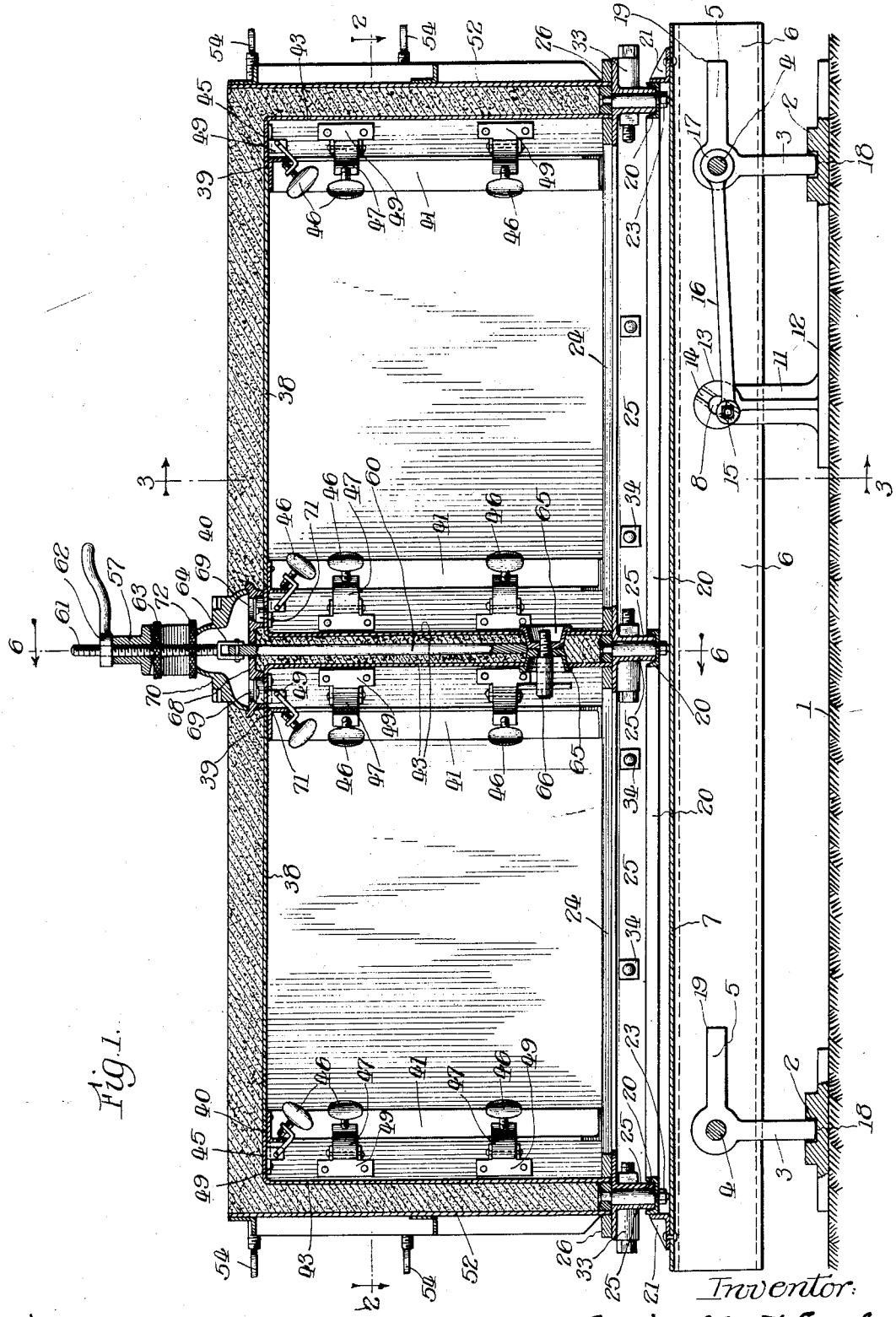

Dec. 16, 1924.  1,519,902
E. M. CAMP
MOLDING MACHINE FOR SHAPING PLASTIC MATERIAL OUT OF
CONCRETE AND OTHER MATERIAL
Filed May 29, 1922  4 Sheets-Sheet 1

Witness:
A. J. Sauser.

Inventor:
Erwin Mart Camp
By W. E. Williams Atty.

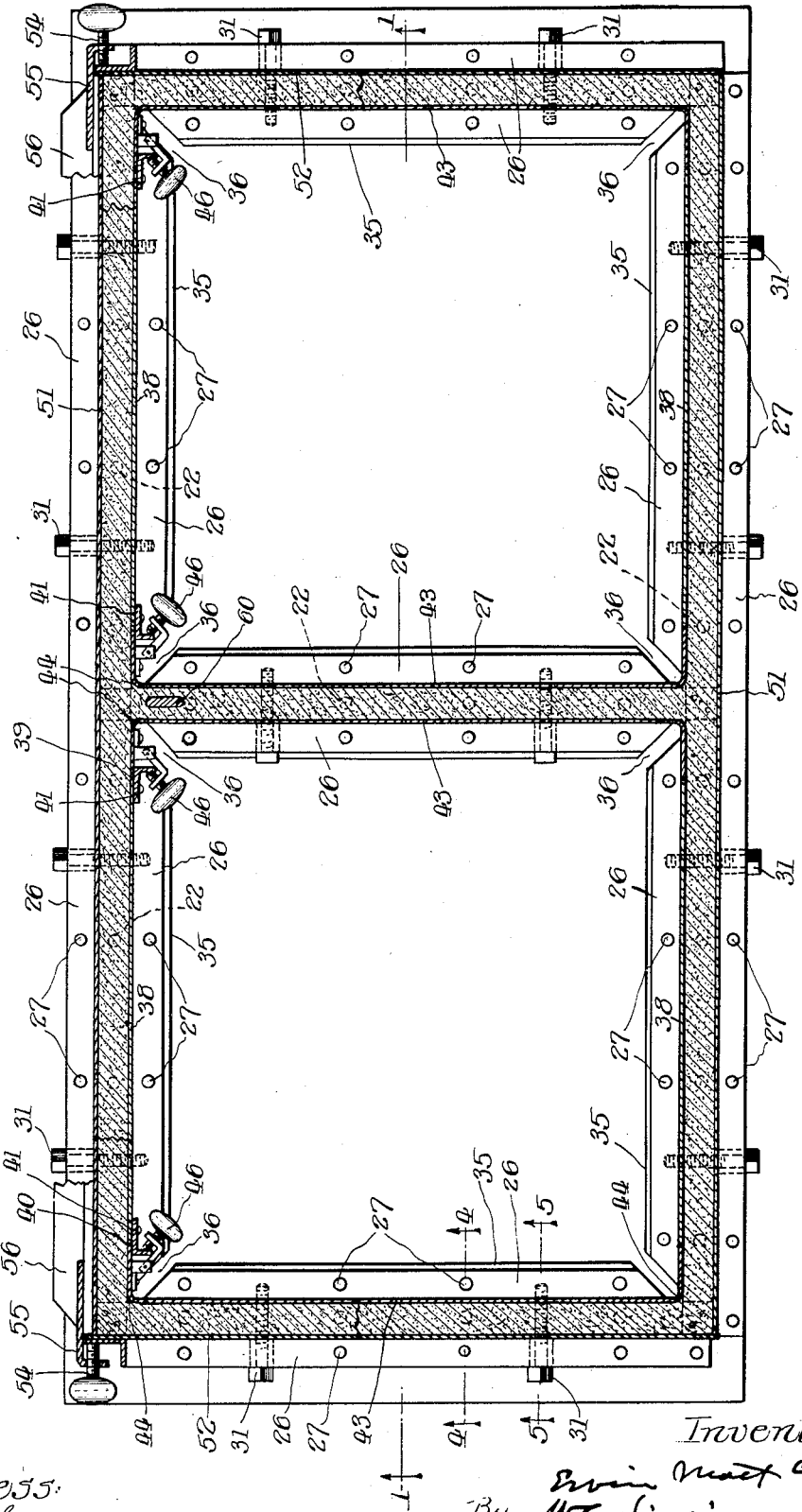

Dec. 16, 1924. 1,519,902
E. M. CAMP
MOLDING MACHINE FOR SHAPING PLASTIC MATERIAL OUT OF
CONCRETE AND OTHER MATERIAL
Filed May 29, 1922 4 Sheets-Sheet 3
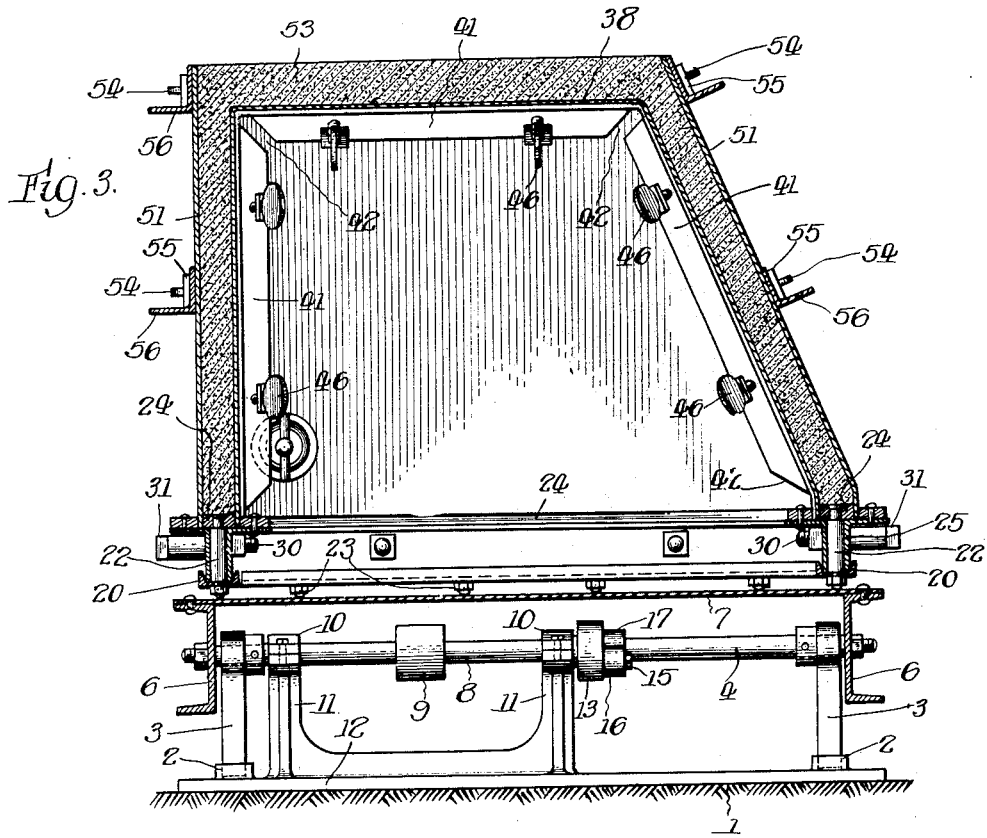
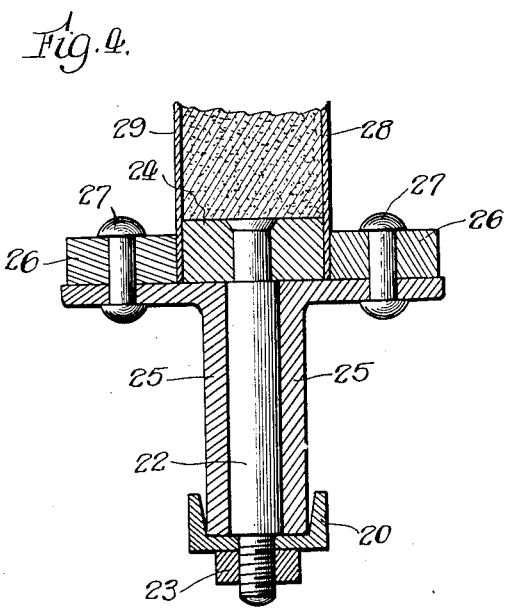
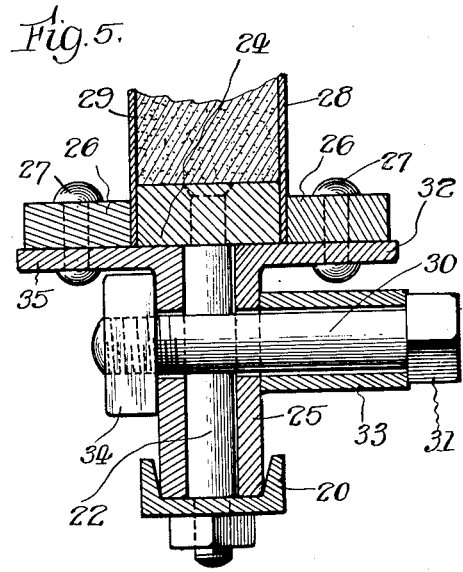

Dec. 16, 1924.
1,519,902
E. M. CAMP
MOLDING MACHINE FOR SHAPING PLASTIC MATERIAL OUT OF
CONCRETE AND OTHER MATERIAL
Filed May 29, 1922
4 Sheets-Sheet 4
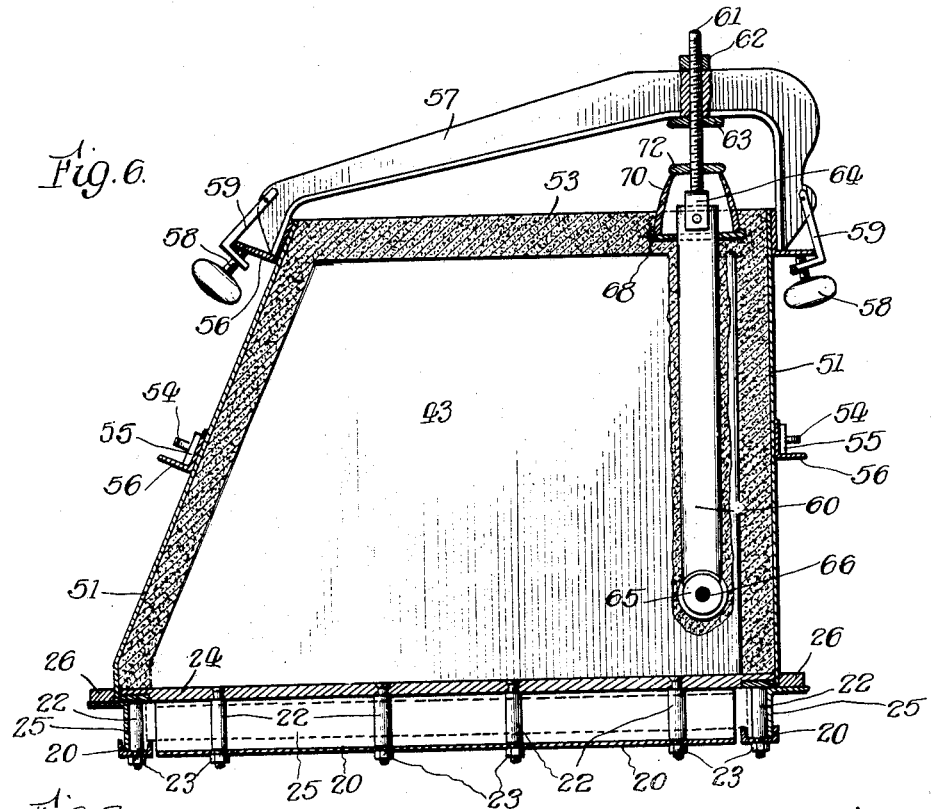
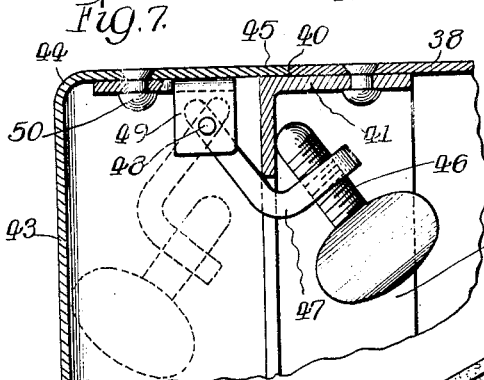
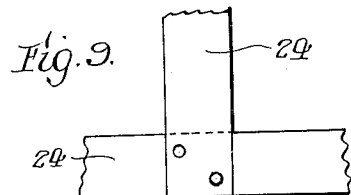
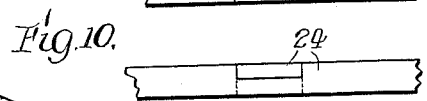
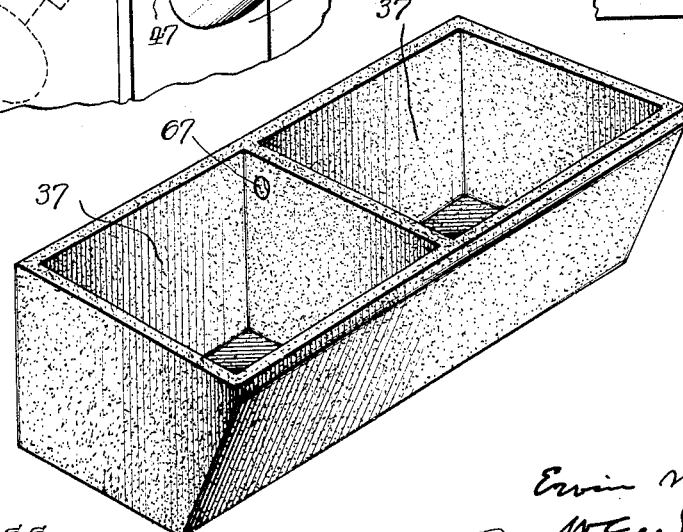
Witness:
A. J. Sauser
Inventor:
Ervin M. Camp
By W. E. Williams
Atty.

Patented Dec. 16, 1924.

1,519,902

UNITED STATES PATENT OFFICE.

ERVIN MOTT CAMP, OF CHICAGO, ILLINOIS.

MOLDING MACHINE FOR SHAPING PLASTIC MATERIAL OUT OF CONCRETE AND OTHER MATERIAL.

Application filed May 29, 1922. Serial No. 564,668.

*To all whom it may concern:*

Be it known that I, ERVIN MOTT CAMP, a citizen of the United States, a resident of Chicago, in the county of Cook and State of Illinois, have invented a new and useful Improvement in Molding Machines for Shaping Plastic Material out of Concrete and Other Material.

Primarily my design was made for shaping laundry tubs molded out of plastic material, but may be used for a wide range of purposes.

The object of my invention is to provide some molding forms that are well enabled to perform the service with the least labor and securing the best results in the molding of the materials, and at the same time provide means for molding of the structures that were heretofore difficult to obtain by the devices heretofore in use. One special merit of my device is the means of easily taking down the forms after the material has been molded and set enough to permit the removal of the form.

Reference will be had to the accompanying drawings, in which Figure 1, is a vertical sectional elevation on line 1—1 of Figure 2. Figure 2, is a plan section on line 2—2 of Figure 1. Figure 3, is a transverse sectional elevation on line 3—3 of Figure 1. Figure 4, is a sectional detail on line 4—4 of Figure 2. Figure 5, is a sectional detail on line 5—5 of Figure 2. Figure 6, is a transverse section on line 6—6 of Figure 1 with the frame base omitted. Figure 7, is an enlarged detail showing part of the corner clamping device. Figure 8, is a perspective view of the laundry tub molded by my device as shown in the drawings. Figures 9 and 10, are details of the junction of the cross members of the bars 24.

Throughout the drawings the molded material is shown in sections and stippled.

In the drawing 1 indicates the floor or the natural ground service on which the machine is supported. 2 indicates some base blocks which set upon the floor and supports the machine through some vibrating legs 3, which are secured to some cross supporting shafts 4, and are provided with some secondary legs 5. The shafts 4 are connected to some side frame channel beams 6, and these beams are connected across at their tops by flat floor plate 7, which forms the bed of the machine upon which the molding parts are carried.

1, provides means for vibrating the whole bed or table composed of channel beams 6, and bed plate 7, so that in that way I vibrate the table and everything on it. This vibrating means is brought about by a shaft 8, carrying a pulley 9, or any other suitable means of power for rotating purposes. This shaft 8 is supported in boxes 10, on supporting pedestals 11, having the base 12, see Figure 3.

Mounted on the end of the shaft 8, there is an eccentric block 13, having a cross slot 14, into which is mounted an adjustable wrist pin, 15, see Figures 1 and 3, which carries a connecting rod, 16, having its end, 17, secured over one of the shafts, 4. When the shaft 8, is revolved the eccentric pin, 15, moves backward and forward the whole frame, and whatever is carried thereby in a longitudinal vibratory motion is produced by the shape of the lower ends of the supporting legs, 3 or 5. In Figure 1, the ends of the legs 3, as indicated by 18 are shaped on a radius of the center of the shaft, 4, so that the longitudinal vibration produced by the eccentric as described, produces only a horizontal movement of the table.

When a vertical movement is desired, the table is lifted and the shafts 4 are revolved bringing the legs 5, into the supporting blocks, 2, and these legs 5, have square corners, 19, which bring about a slight vertical movement, or vertical jarring, when the table is vibrated horizontally.

Thus my arrangement of supporting and moving the main table, may, as desired, produce only horizontal movement, or a horizontal and a vertical movement of jarring and jolting of the table and its contents which is a great desideratum. The article to be molded of course requires forms to be made to fit the article, but in a general way, made in accordance with my invention. In order to secure the best results and to mold the article shown in the drawing, I provide a skeleton frame work made of channel pieces, 20, which extend horizontally and crosswise and from the supporting base pieces for the individual molds. This frame work of channel pieces, 20, is held from displacement of the table plate, 7, by some little casting brackets, 21, see Figure 1. Fixed to these channel frame pieces, 20, in a permanent manner are some studs, 22, secured to the channels by nuts, 23, see Figure 4. On the upper end of these studs there are secured cross blocks or bars, 24, so that the cross bars 24, studs 22, and channels 20, when once assembled become unitary members of the device. As base members also of the molding device I provide a series of angles, 25, see Figures 4 and 5, on which are permanently secured some bars, 26, riveted to one leg of the angles by rivets, 27. These bars, 26, and angles, 25, are used around the structure wherever needed, and form clamps which hold the side walls of the mold chambers.

The mold chambers are made of a series of sheets of metal, as generally indicated by sheet, 28, on one side and 29 on the other side, see Figure 5. In between these side walls the material is packed, that is, molded to form. These side walls 28 and 29 are clamped together by the blocks 26 through the medium of clamping bolts 30, having a projecting head, 31. This head projects beyond the edge of the flange, 32, on the angle bars, 25, in order to be accessible to the reach, and the thimble, 32, is threaded over the bolt to provide for this extension beyond the flange 32 of the angle. The nut, 34, on the end of the bolt is seated under the horizontal flange, 35, of the angles 25 so close as to prevent the turning of the nut when the body of the bolt is turned, in clamping the side walls 28 and 29 onto the block 24 by turning only the bolt 30.

The arrangement of these clamps is shown in the various views, Figure 2 shows the ends of the angle bars 25 cut with clearance spaces 36 to permit the easy release and assembling of the parts.

The angle bars 25 with the blocks 26 as previously described relate to the margin or lower base connections to the walls of the molds.

The bottom of the molds on the inside to take care of the chambers of the molded article 37, is composed of a continuous piece, 38, Figure 3, and there is secured on the ends of this strip the angle pieces 41 which are bent to conform to the inside of the sheet 38. One flange of the angle 41 is cut away at the points 42 and also at the ends in like manner, in order to allow the bending of the angles with the plate 38 when the plate 38 is being removed from the formed or molded body.

The ends or division walls of the several chambers of the article to be molded are produced by some end plates 43, which are provided with round corners 44, and may be made in any suitable manner by being built up, cast or pressed in shape.

The flanges of these end pieces as indicated by 45, embrace the angle pieces 41 and meet the walls 38 at the points 39 and 40, see Figure 1. These end walls 43 are clamped to the sections 38 by means of some thumb screws 46, screwed into some angle blocks 47, hinged at 48 to some blocks 49, secured by rivets 50 to the end piece 43, This arrangement of thumb screws 46 is repeated wherever desired or necessary in holding the end pieces into place in connection with the walls 38 that form the inside chambers of the article to be molded.

The outside or side walls of the mold are made of flat plates 51, extending the long distances and with the end plates 52. The bottom of the article to be molded indicated by 53 in Figure 6, I prefer to leave open and have the open space in which the plastic material is filled into the molds. It being understood that the article shown in the drawing in Figure 8 is molded bottom side up and the mold is prepared locked together, and then filled and then after the material is set the mold is reversed and the form parts removed from the inside by access to the open side of the article molded.

The outside walls 51 and 52 are held together by a series of corner clamp screws 54, secured in some brackets 55, fastened to some cross stiffening angles 56. In order to lessen the strain upon the top cross stiffening angles 56, or rather the angles which hold together the molding and pieces, at the bottom 53, of the article to be molded, I provide a cross arm 57, secured by some screws 58, into some hinge arms 59, in a similar manner to the other hinge arms 47. This cross arm 57 not only ties across the stiffening angles 56, but also provides a further function of holding a core piece in place, and also holding in place a casting for forming the draining connection for the tub. The core member thus held by the said arm 57, is indicated by 60, see Figures 1 and 6, and this is supported from the arm 57, by the screw rod 61, held in place by nuts 62 and 63, and the screw rod is secured to the core piece by the bifurcated block 64. At the lower end of the core 60, there is provided some bung shaped blocks 65, clamped together by clamp screw 66, which serves to mold into the article the overflow bung holes 67, see Figure 8, into the article itself.

The ordinary outlet for the tub or article to be molded is provided for by a casting 68, which is inserted in the mold, see Figures 1 and 6, and is provided with the escape outlets 69, see Figure 1.

A secondary or nozzle casting 70, see Figures 1 and 6, is also inserted and molded in place to form the the nozzle for the orifices 69 and the overflows 67.

The casting 68 is registered in position on the mold by means of some little washers 71, fixed to the end pieces 43, of those particular chambers. The castings 68 and 70, are secured firmly in place by means of a nut 72 on the rod 61, see Figures 1 and 6.

The forms are set up in place on a table and then the plastic material is poured into place and jolted horizontally and vertically by means previously described, which secures a firm assembly of the material, and then this mold is bodily lifted off from the bed or table plate 7, of the table and allowed to sit in some place in a quiet state until the material is firmly set, then the wall sections are taken down by removing the parts that are accessible from the different sides, the core 60 and lever arm 57 being removed before the interior walls are taken out or the article is reversed as to position, to get access to the inside to remove the inside walls the form is turned over.

The removal of the core 60 in order to leave the passageway for which the core is used, I leave the arm 57 in place and loosen the nut 63 and tighten the nut 62, see Figure 6, and thus as it were draw the core 60 upward through the medium of the screw 61, and do this slowly and carefully without damaging the molded article. There is a slight taper to this core 60, which when after freed from its position in place by the screw 61, the balance of the movement in withdrawing the core may easily be done by hand. This method of withdrawing this core block 60 is a great advantage in the work.

The blocks 24 which set the distances for the spaces between the walls 28 and 29 and the other similar walls are lapped across each other half down, as is shown in plan in Figure 9, and in end view in Figure 10, and this detail occurs wherever necessary to suit the form of mold desired.

By the mold construction and apparatus as I have shown I am permitted to make articles out of concrete or of various plastic materials that have not heretofore been easily made. Certain it is that with my construction cheaper and better articles are made than by any other system that has been effected with which I am familiar.

The construction I have shown and described produces means whereby the molded forms may be locked together substantially water tight, which has been heretofore accomplished by no apparatus of which I am aware that is adaptable to molding articles that may be molded with my device.

This feature of being tight and avoidance of leaks is especially necessary in an apparatus where jolting or vibration of the material take place. Small leaks which are open when the jolting takes place allow enough leakage to permit small voids and defects in the final end of the molding, which amounts to making the article worthless.

The structures that are made and may be made with my device are more or less complicated and with thin walls, and a very small defect will make the finished article useless and be a matter of serious expense from the standpoint of the percentage of losses in the manufacture from defective articles.

The means I have shown and described permit the clamping together of the mold forms at every joint in a manner that permits an almost certain control of obtaining a complete and perfect article at each molding which is a great desideratum.

For convenience and understanding the several parts of my device, I prefer to call the angle bars 25 and spacer blocks 24 secured together by the studs and bolts as described, as the mold base pieces, and I prefer to call the side end walls which hold the material to form the ends of the chambers to be molded, as the inside end walls, and I prefer to call the wall 38 which forms the side walls of the inside of the chambers, as the inside side walls. As to the outside of the mold sections, I prefer to call the long members outside side wall members, and the end pieces outside, end pieces or walls.

What I claim is:—

1. In a device of the class described, the main supporting base bed adapted to be vibrated by suitable means, a mold form carried on said bed and said mold form composed of mold base pieces having separator blocks adapted to space apart the opposing walls of the molds and clamping members provided to clamp the said walls of the molds tightly to each side of the said separator blocks in combination with suitable mold walls clamped as aforesaid, and suitably arranged and assembled together.

2. In a device of the class described, a series of side walls both external and internal adapted to confining plastic material in shape to form hollow articles, said side walls built up in sections and provided with suitable clamps to bind the several sections together, separator blocks interposed between the edges of the inside and outside walls adapted to hold them asunder to furnish spaces into which the material is filled. A series of clamping bars arranged on each side of the walls and provided with means for simultaneously clamping each wall to the separator blocks.

3. In a device of the class described, a supporting table adapted to be vibrated and jolted, a movable form mounted upon the said table and composed of a series of side walls both internal and external adapted to mold hollow articles and said side walls supported upon a base frame work and said base frame work supported on the said table, a series of clamping guards composed of a series of angle-iron beams supporting the mold form on one of their legs and secured in clamping relationship to the walls of the mold form by bolts passing through the other legs adapted to clamping side walls to the supporting frame work and suitable means for vibrating and jolting the said supporting table.

4. In a device of the class described, a mold form adapted to mold hollow articles and provided with interior and exterior walls and said walls clamped in a detachable manner to a supporting base frame in combination with means for supporting a core to form an outlet through one of the walls of the article to be formed and mechanical means for withdrawing said core from the finished molded article.

5. In a device of the class described, a framework adapted to carry a mold form, said framework supported upon legs mounted in base blocks and said legs connected through the frame work upon a rocking shaft connected to the table, and means are provided for moving the said table horizontally.

6. In a device of the class described, a table adapted to carry and vibrate a mold form and said table supported upon legs hinged to the said table in combination with a secondary set of legs having differently shaped ends adapted to be revolved into active positions when desired for the purpose of varying the character of the vibratory movement.

7. In a device of the class described, a table adapted to carry mold forms, means for vibrating the said mold form composed of a series of legs hinged to the table and having their ends shaped in both rectangular and curved shapes, and adapted to be supported in said blocks in combination with means for moving the table in relation to set said blocks whereby the angularly shaped ends of the legs cause a vibratory movement as well as a horizontal movement of the table.

8. In a device of the class described, a mold form adapted to form hollow articles, such as laundry tubs and the like having interior and exterior walls, the edges of said walls clamped on each side to a separating block and said clamping means composed of a series of angle bars connected across with each other by a series of clamping bolts.

9. In a device of the class described, a mold form having interior and exterior walls and the said walls supported on a supporting base frame, said base frame composed of a base piece of channel section and a rectangular shaped piece adapted to act as a separator between the interior and exterior walls of the form, and the said channel sections and rectangular sections connecting to each other by a series of studs, in combination with some angle bars located between the said channel section and rectangular section, and on each side of the said studs and connected across by clamping bolts to each other, and each angle section provided with a block adapted to bear against a wall of the mold form.

10. In a device of the class described, a base frame piece composed of channel sections, angle blocks and rectangular blocks associated together in a manner to act as supporting means for the interior and exterior walls of the mold form and provided with a series of clamping bolts whereby one act of clamping clamps both walls of the form to the base frame.

11. In a device of the class described, a mold form adapted to mold hollow articles and made out of composite sections adapted to be assembled together and clamped into a unitary structure, and means provided on said form for holding parts to be molded into the article to be made in the form, and means for holding a core in the form and mechanical means for forcibly withdrawing the core from the molded article.

12. In a device of the class described, adapted to mold hollow articles, a core adapted to extend down within a wall of the article, a supporting device for said core and mechanical means for withdrawing the core.

13. In a device of the class described, for molding hollow articles of the tub form, a core adapted to extend within one of the walls of the article to be molded, and said core held in place at one end by some bung-forming blocks and supported in the other end by the outlet forming block, and mechanical means for withdrawing the core from the molded article.

14. In a device of the class described, a series of inside walls and a series of outside walls clamped in position to mold a tub-like article in inverted form, a cross connecting member extending across the body of the device and means for connecting to this cross connecting member, for holding in place a block forming orifice to the article molded.

15. In a device of the class described, adapted to mold tub-like hollow articles, a series of walls adapted to shape materials in form, a cross connecting member extending across the body of the form and provided with means for supporting in the form a block and a core as adapted to be molded in the article, and means composed of a screw and nuts thereon adapted to withdraw the core from the finished molded article.

16. In a device of the class described, inside walls and outside walls shaped to mold a hollow article of the tub-like form, the margin of the inside and outside walls that form the margins of the tub, clamped together by clamping means extending across and underneath the margin of the walls in combination with a cross member extending across the outside of the walls, being that side which forms the bottom of the molded article, and means connected to this cross member for supporting in place a core adapted to form an escape aperture in the molded article.

17. In a device of the class described, a mold form adapted to mold plastic material in shape for articles such as laundry tubs, a core block adapted to be supported in a space to be occupied by a wall of the article when finished and to be withdrawn therefrom after the molding operation is completed thus leaving an open space where the said core was located, and the said core supported from the walls of the mold through the medium of a screw threaded rod adapted to be adjusted upward or downward in locating the position of the core and withdrawing it from the molded article.

18. In a device of the class described, inside walls and outside walls adapted to mold a tub-like article, the said inside walls clamped to a base frame in fixed relationship to the outside walls, the said outside walls also clamped to the same base frame, the both sets of walls made of separate sections and the said sections clamped together in a manner adapted to be taken down and removed in combination with a cross connecting member detachably connected to the said side walls, and said cross connecting member having a screw threaded rod adapted to hold in place blocks that are molded in and permanently set in the finished article, and also hold in place a core for forming a passageway in a wall of the molded article and means connected to the said cross' connecting member for assisting in withdrawing the said core.

Signed at Chicago, in the county of Cook and State of Illinois, this 23rd day of May, 1922.

ERVIN MOTT CAMP.